US006189190B1

(12) United States Patent
Gillet et al.

(10) Patent No.: US 6,189,190 B1
(45) Date of Patent: Feb. 20, 2001

(54) SYSTEM FOR THE REMOTE HANDLING OF EQUIPMENT PARTICULARLY ADAPTED TO ELASTIC RINGS

(75) Inventors: Pascal Gillet, Sarcey; Fabrice Petit, Orcevaux, both of (FR)

(73) Assignee: Gillet Outillage, Nogent (FR)

( * ) Notice: Under 35 U.S.C. 154(b), the term of this patent shall be extended for 0 days.

(21) Appl. No.: 09/331,422

(22) PCT Filed: Dec. 16, 1997

(86) PCT No.: PCT/FR97/02311

§ 371 Date: Jun. 21, 1999

§ 102(e) Date: Jun. 21, 1999

(87) PCT Pub. No.: WO98/26904

PCT Pub. Date: Jun. 25, 1998

(30) Foreign Application Priority Data

Dec. 19, 1996 (FR) .......... 96 16083

(51) Int. Cl.[7] .......... B23P 19/04
(52) U.S. Cl. .......... 29/229; 29/268
(58) Field of Search .......... 29/229, 268; 269/6, 269/212, 238, 157; 81/319, 321, 322

(56) References Cited

U.S. PATENT DOCUMENTS 2,532,141 * 11/1950 Barkan et al. .......... 81/322
3,091,143 5/1963 Coy .
4,653,309 3/1987 Hendricks et al. .
5,096,170 3/1992 Albin .

FOREIGN PATENT DOCUMENTS 43 12 846 4/1994 (DE) .
295 15 050 U 11/1995 (DE) .
296 03 425 U 4/1996 (DE) .
2 372 686 6/1978 (FR) .

* cited by examiner

*Primary Examiner*—Robert C. Watson
(74) *Attorney, Agent, or Firm*—Young & Thompson

(57) ABSTRACT

A device for the remote handling of equipment (4) for instance designed for mounting elastic rings (6) comprises a fixed jaw (8) and a mobile jaw (12) which moves linearly relative to the fixed jaw (8) by actuating elements coupled to the equipment (4) by a cable (2) connected to the mobile jaw (12) inside a sheath (3) one end of which comes to stop (10) on the fixed jaw (8). The actuating elements consist of two branches (13, 14) articulated on a common axis (15) such that the distance between their free end (131, 141) is not less than the maximum displacement of the mobile jaw (12), when bringing closer the two handles (16, 17) respectively integral with the two branches (13, 14) of which the free end (131) of one (13) acts as a stop to the other end of the sheath (3) while allowing the cable (2) that is connected to the free end (14) of the other arm (14) to slide.

10 Claims, 3 Drawing Sheets

SYSTEM FOR THE REMOTE HANDLING OF EQUIPMENT PARTICULARLY ADAPTED TO ELASTIC RINGS

CROSS-REFERENCE TO RELATED APPLICATION

This is the 35 USC 371 national stage of international application PCT/FR97/02311 filed on Dec. 16, 1997, which designated the United States of America.

FIELD OF THE INVENTION

This invention relates to a remote handling system for equipment such as that comprising a fixed jaw and a movable jaw capable of being linearly displaced in relation to the fixed jaw by actuating means situated remotely, and which is particularly useful for the assembly and dismantling of tensioned elastic rings widely used in the field of automobiles, for example for fixing hoses onto the cooling pipe system that are subjected to wide variations in their external diameter due to large expansions. It is known that it is not possible to use, for example rigid rings fitted with screws to maintain sealed connections between hose and pipe. From this arises the interest in using rings that are clamped elastically known in the text that follows as elastic rings.

BACKGROUND OF THE INVENTION

It should be remembered that such rings are normally manufactured from a strip, shaped into a ring that is generally circular. The ring itself is naturally capable of being deformed because of the gap between its two ends which creates an elastic restoring moment used to provide the clamping. For a long time, it has been known to produce this type of ring by causing the two ends of a spring strip to overlap. A central cut-away portion of the strip forming the ring extends over a few centimetres to one of its ends to form a passage for the other which is reduced in width in order to be coincident with this passage. The two ends of the strip are fitted with lugs obtained by simple rectangular bending of their end parts towards the outside of the ring in such a way that using pincers fitted with jaws, one can easily bring the two lugs towards one another, that is to say increase the diameter of the ring which when released causes the elastic restoring moment necessary for the clamping.

Numerous tools for assembling and dismantling elastic rings are available to users and most of these tools, manual or automatic operate on the basis of very simple lever systems such as, for example x-shaped pincers.

The major disadvantage of these tools for elastic rings resides in the fact that for assembling hoses onto an automobile engine, for example, it is practically impossible to ensure that one obtains precise positioning of the ring on a sleeve. Actually, the ring, having a diameter clearly greater than the diameter of the sleeve to be clamped can find itself in any position when the two lugs on the ring are released in order to clamp it ; at this precise moment, the ring takes up a position that is totally random and generally uncontrollable by the operator who often cannot see it. It is even a common occurrence on assembly, that this type of ring released suddenly and positioned crosswise leads to the hose that is assembled on the end of the pipe being distorted. In the more favourable situation where the operator notices the problem, the correct positioning of a badly positioned ring requires a repeat operation that is often difficult because of the lack of accessibility that is generally the case. In any case, it is essential to unclamp the ring as little as possible in order to replace it in the correct position, which is often impossible.

In order to remedy such difficulties notably of access, one often has to use extended pincer systems which remain difficult to work with. Also known is the German utility model DE-29603425 pincers for the mounting and the disassembly of elastic rings that comprise pressure pincers connected to a slide forming a jaw that is movable by means of a flexible cable. This device while it permits more easy remote operation for the mounting and disassembly of the rings is characterized in that the slide assembly comprises a stop device in an open position for the ring, on which the operator must act for the final positioning of the same ring or for its removal in the case of disassembly; this device has the serious disadvantage that the operator is obliged to manipulate the slide assembly and the releasing system with just one hand, the other hand, in principle having to manipulate or to hold the pressure pincers. It would therefore appear to be extremely difficult to use the same hand for positioning and for releasing the ring at the same time, particularly when access is difficult. and a movable jaw capable of being linearly displaced in relation to the fixed jaw by actuating means situated remotely and linked to said tool by means of a cable connected on the one hand to the movable jaw and sliding inside a sheath that is advantageously flexible, one end of which is in abutment with the fixed jaw in order to allow the cable to slide, such a system being characterised in that the actuating means consist of two arms which are articulated on one and the same axis in such a way that they are separated in an angular sense, to such an extent that the distance between their free ends is at least equal to the maximum displacement of the movable jaw, when two handles respectively integral with the two arms are brought towards each other, the free end of one arm being used as a stop at the other end of the sheath while at the same time the cable which passes through it and is connected to the free end of the other arm, is allowed to slide freely.

This manipulation system, each arm of which together with its handle stays within the plane of their respective movements on the same side of a median line of the plane passing between the two arms, the two handles and their centre of articulation, is particularly advantageous for application to the mounting and dismantling of elastic rings even when they are situated at points with very difficult access, which is generally the case in the engines of presentday vehicles.

It is actually sufficient to match the fixed jaw and the movable jaw of the remotely operated tool for it to be inserted onto the lugs of an elastic ring that is completely standard and not pre-stressed. For dismantling, it is very easy to engage the two jaws around the lugs of the ring to be unclamped using for example a left hand with the right hand holding the remote handling device, in the position with the handles apart, in order to facilitate the entry of the jaws onto the lugs. For dismantling, a simple pressure with the right hand is sufficient to bring the two handles towards each other, which determines a torque that is enough to bring the movable jaw closer to the fixed jaw which as a consequence increases the diameter of the ring and brings about the required unclamping. Conversely, if one wishes to reposition the ring which has been unclamped into the correct position or into another position on the hose, one has only to gently release the two handles of the remote handling device until the left hand can easily release the movable jaw and fix the lugs of the ring.

BRIEF DESCRIPTION OF THE INVENTION

It is understood that the interest of such a system of remote handling and other characteristics and advantages will better be apparent from the description of a remote handling device given by way of an example of the invention which is not limitative and which refers to the appended drawings in which.

Figure 3:
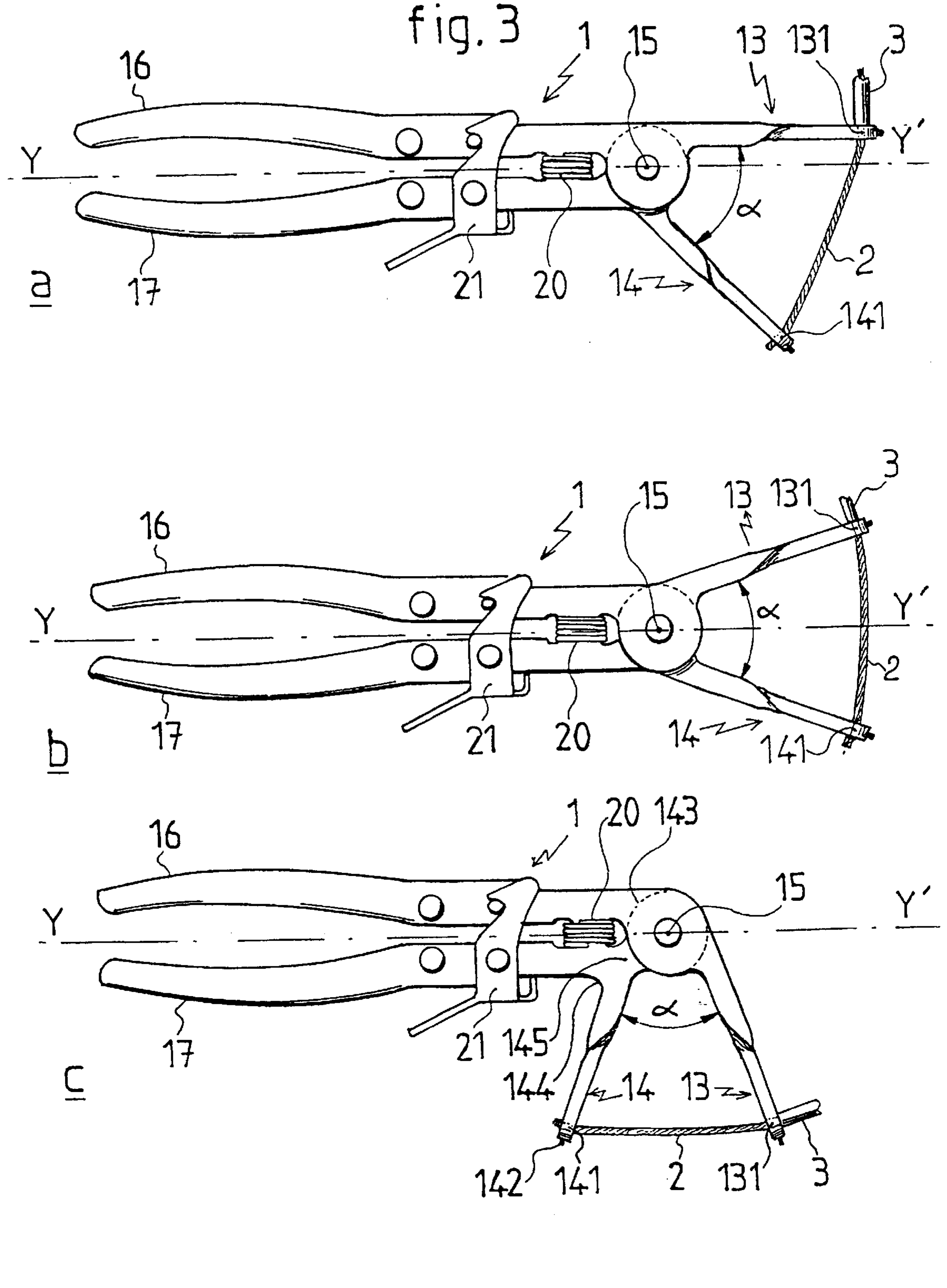

FIG. 3 diagrammatically represents the three main variants of form for the remote handling device of the invention.

DETAILED DESCRIPTION OF THE INVENTION

Referring to the Figures, the remote handling device 1 conforming to the invention is connected by an assembly comprising a cable 2 inside a sheath 3, to a tool 4 enabling one to act on lugs 5 of an elastic ring 6 for the purpose of mounting it or dismantling it for example on a hose.

Figure 1:
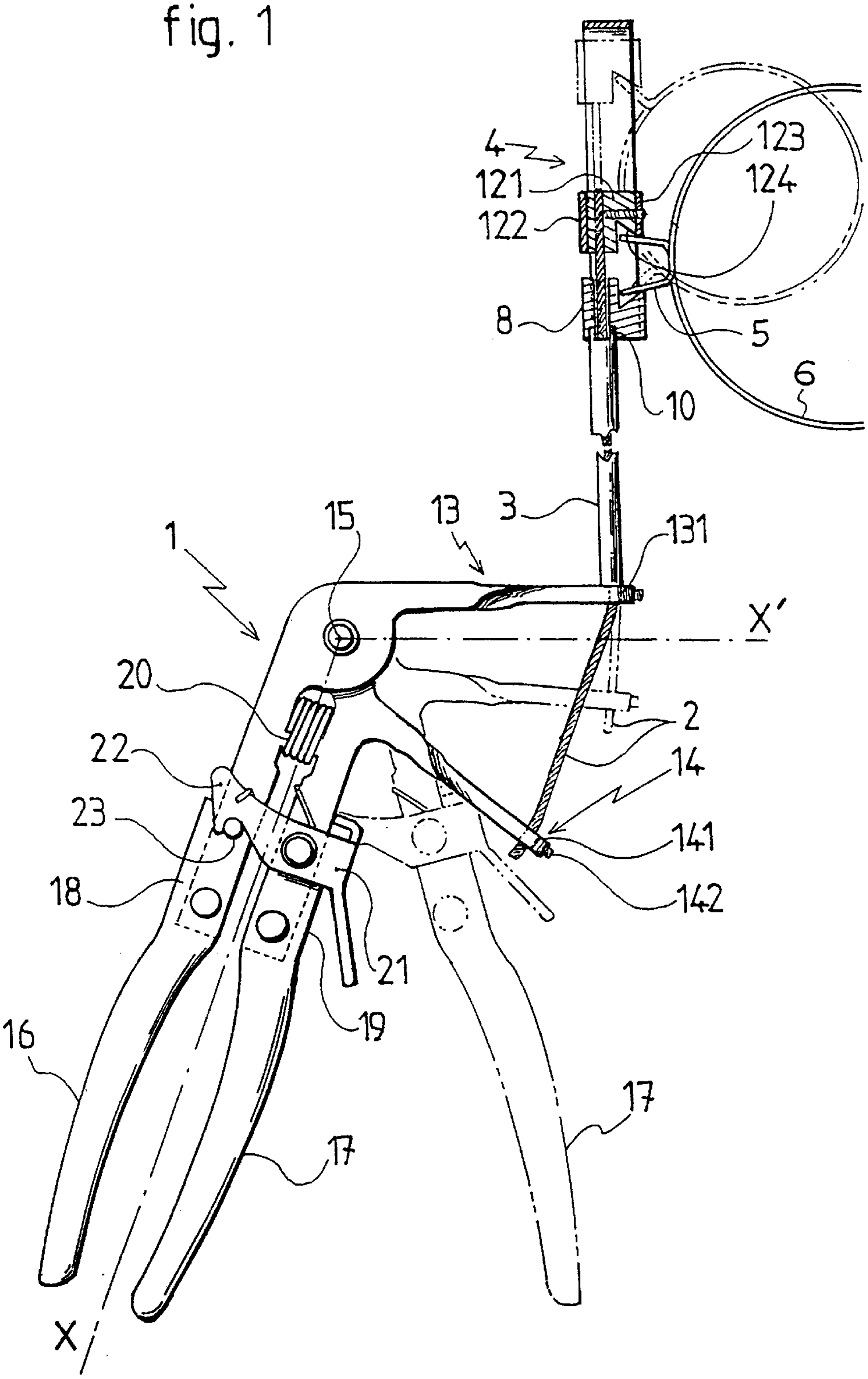
FIG. 1 shows in continuous lines a remote handling device conforming to the invention viewed from the front in the position with the handles close together corresponding to a pre-stressed elastic ring in the position for mounting and in broken lines, the same remote handling device in the position with the handles spaced apart corresponding in principle to the clamped position of the elastic ring.
Figure 2:
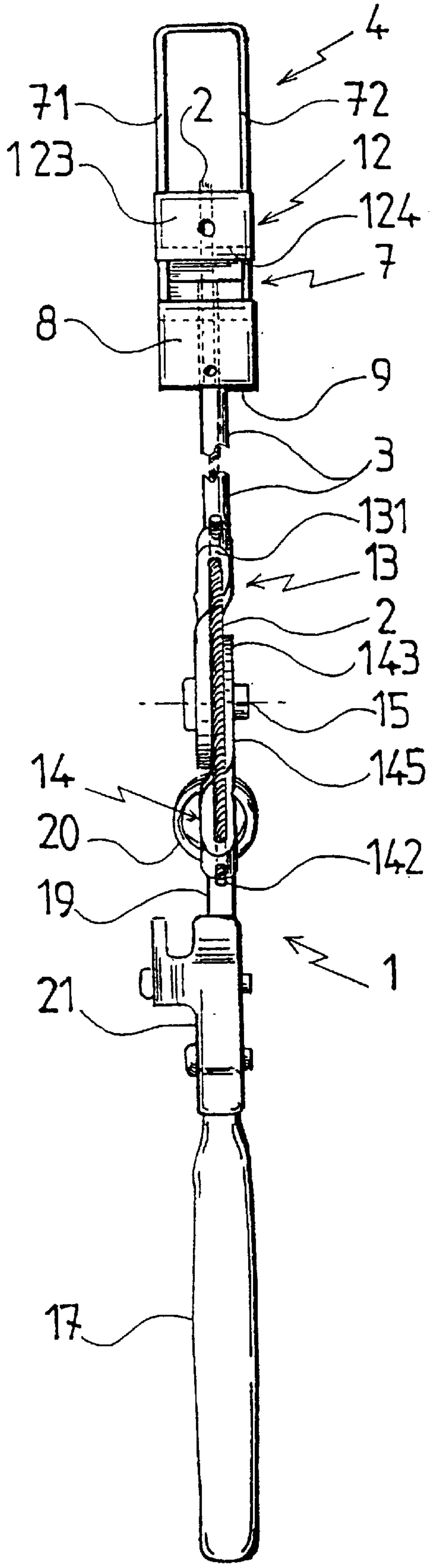
FIG. 2 is a side view of the remote handling device of the preceding Figure in the position of maximum opening of the movable jaw.

Conforming to FIGS. 1 and 2, the equipment 4 for clamping or unclamping the ring 6 is essentially made up of a clevis 7 advantageously obtained from a flat piece of iron folded into a U the two wings of which are joined at their end around a component 8 that constitutes the fixed jaw. The fixed jaw is equipped in its rear part 9 with a bore 10 with the inside of which the flexible sheath 3 comes into abutment. On the same axis as the bore 10, a hole 11 allows passage of the cable 2 which can extend as far as the movable jaw 12 arranged astride on the inside of the clevis 7 with vertical slots being used as a guide rail for its linear displacement. The cable 2 is fitted into a bore made in the movable jaw 12 and fixed to it by means of a screw to clamp it.

The movable jaw 12 is formed from an inner block 121 that takes up the same space as the width of the clevis 7 to form a lateral guide to the jaw 12. Above and below the component 121 there are attached two plates 122 and 123, which come into contact with the slots in the clevis 7 in such a way as to form a slide with the two sides 71, 72 of the clevis. From the plates 122 and 123 forming the slides and on the side of the movable jaw 12 facing the fixed jaw 8, surfaces 124 that slope towards the interior of the block 121 are provided that permit formation of a housing shaped like a half swallow-tail to receive the first lug 5 of the ring 6 without there being any risk of it accidentally being dislocated at the moment of clamping.

Optionally, the fixed jaw 8 is constituted in the same way as the movable jaw 12 by a central block fixed on each side to the two side wings 71, 72 of the clevis 7 and held top and bottom by two backing plates formed like the jaw 12 to receive the second lug 5 of the ring 6.

The remote handling device 1 is essentially made up of two arms 13, 14 capable of moving apart from one another by rotation about an axis 15 so as to define between their two ends 131, 141 a displacement equivalent to that of the free jaw 12 over the clevis 7 in the direction of and up to contact with the fixed jaw 8. This linear movement of the fixed jaw 12 is naturally obtained by tension on the cable 2 fixed to the end 141 of the inner arm 14 of the remote handling device 1, thanks to a cotter pin or a screw 142. Of course, the cable 2 transmits its movement to the tool 4 by means of the sheath 3 coming into abutment with the end 131 of the outer arm 13 of the remote handling device 1.

According to an essential characteristic of the invention, each arm 13 or 14 is associated with a handle, respectively 16 or 17, in accordance with a particular arrangement that causes each arm to correspond with the handle situated on the same side of a line XX' that coincides with the median line of handles 16, 17 and arms 13, 14 passing through their centre or their articulation axis 15 ; conforming with FIG. 1. The result is that when the two handles 16 and 17 move toward each other by rotation about the axis 15, the arms 13 and 14 move apart and contrary to this, when the handles move apart from one another, the two arms 13 and 14 tend to move toward one another.

According to a particularly advantageous construction of the remote handling device 1, that makes reference notably to FIG. 2, the remote handling device 1 is cut away into a strip of; thickness 5 mm for example, defining on each side of a plate, centred on the axis 15, used to rotate the tool, on the one hand handle supports 18, 19 and on the other hand the arms 13 and 14 that one will have previously twisted 90° onto themselves to be used by the outer arm as a stop for the sheath 3 and by the inner arm as a fixing system for the actuating cable 2.

Optionally, two ergonomic handgrips are fixed astride the two ends of the handle supports 18 and 19 in order to provide a better grip on the tool.

Conforming to FIG. 3, it is possible to produce the remote handling device conforming 1 to the invention in accordance with three main configurations.

In accordance with FIG. 3*a*, the remote handling device 1, in the at-rest position, that is to say with the two handles 16, 17 close to one another, is such that a first arm 13 is positioned in an extension of handle 16 with which it is connected along an axis YY' perpendicular in direction to the axis of articulation 15, the two axes not necessarily intersecting and that the second arm 14 forms, with the handle 17 with which it is connected, an angle a in the plane of movement perpendicular to the axis of articulation 15 of a size such that the distance between the free ends 131, 141 of the two arms 13, 14 is at least equal to the displacement of the movable jaw 12 from its position furthest from the clevis 7 to being in contact with the fixed jaw 8 of the tool 4.

According to another variant represented in FIG. 3*b*, the remote handling device 1, still in its at-rest position, is such that each arm 13, 14 is symmetrically angled with respect to the median axis YY' of the tool, so that in a definitive way, it determines an angle a identical to the variant a.

Finally, according to a final variant shown in FIG. 3*c*, the remote handling device 1 is such that the two arms 13, 14 are angled on the same side of the median axis YY'. Naturally the angles of the outer and the inner arms are calculated so that, in the at-rest position, that is to say in the position where the two handles 16, 17 are close to one another, the arms make between them an angle equal to β as in the preceding variants.

According to a preferred arrangement of the invention, the area of articulation 143 of the inner arm 14 does not coincide with the area 144 where the same arm joins with its handle 17, but is offset by an appendage 145 that unites the two areas 143, 144. It can be easily understood that the position of the arms 13, 14 particularly when the two handles are in the most spaced apart position depends on the length of the appendage 145 joining the articulation axis 15 to the assembly made up of the arm 14 and the handle 17. As a consequence, the traction couple exerted by the arm on the cable 2 can be made the most suitable and the angle of the cable 2 with respect to the arm 13 can be reduced when the arm 14 describes the angle β, which improves the operation of the remote handling device 1. A man skilled in the art is perfectly capable of matching the geometry of all these elements, that is to say the length of the arms 13, 14 as well as the length of the appendage 145 in relation to the length of the handles 16, 17 that constitute the lever arms of the remote handling device 1.

According to the optional arrangements of the remote handling device 1, between the two handles 16, 17 and close to their articulation point 15, a return spring 20 urges these handles apart in the at-rest position, that is to say the movable jaw is urged to the end of the clevis 7 of the tool 4.

The spring 20 is a simple coil spring clamped between two bosses provided in the slot of the handle supports 18, 19.

In the same way, advantageously a ratchet mechanism 21 is provided, mounted for example on the handle support 19, in such a way that its end hook 22 cooperates with a stub 23 provided on the other handle support 18 to keep one handle against the other when they are close together, that is to say when the movable jaw 12 is brought close to the fixed jaw 8. Naturally, a manual device 24 allows one to release the hook 22 from the stub 23 at any time, and thereby release the two handles and by doing this any tension on the lugs 5 so that the elastic ring 6 is disengaged.

It is obvious that if the remote handling device 1 coupled to its tool 4 is particularly suited to the mounting and dismantling of elastic strip rings, it is always possible to use the remote handling device in any situation where it is necessary to linearly actuate two jaws relative to one another and that this can be done remotely by means of a flexible sheath. In this sense, the particular application to elastic rings constitutes one example, no doubt a very important example, but one which does not, in any way, restrict the scope of the invention.

What is claimed is:

1. Apparatus for remote handling of equipment, comprising:

a fixed jaw and a mobile jaw;

actuating means for linearly displacing the mobile jaw relative to the fixed jaw; said actuating means comprising a first arm integral with a first handle, and a second arm integral with a second handle; said handles being articulated on a same articulation axis; each arm having a free end;

a cable having two ends and coupling said actuating means to said equipment; a first end of said cable being connected to the mobile jaw, said cable sliding inside a flexible sheath having a first end and an opposite second end; the first end of the sheath abutting the fixed jaw, and the free end of said first arm structured and arranged to serve as a stop for the second end of the sheath, while allowing the cable passing therethrough to slide freely; the free end of said second arm being connected to a second end of said cable;

a ratchet mechanism mounted on one of the handles cooperating with a stub provided on the other handle for holding said handles one against the other and therefore keeping the mobile jaw in a position close to the fixed jaw, except when the stub of the ratchet is released by the action of an unlocking mechanism; and wherein the first arm and the first handle are aligned parallel to a median axis passing through the articulation axis between the handles, and the second arm and second handle form between them, an angle in a plane of movement perpendicular to the articulation axis of a size such that when the two handles are brought towards one another, the distance between the free ends of the two arms is at least equal to the maximum linear displacement of the mobile jaw.

2. The apparatus according to claim 1, wherein each arm and its respective handle is formed as a strip substantially leaving supports for the handles and the articulation flat, while the arms are twisted 90° on themselves to receive respectively at their free ends machining forming the stop for the sheath for the first arm, and the cable connection for the second arm.

3. The apparatus according to claim 1, further comprising a return spring arranged between the two handles close to their articulation, said spring urging said handles and hence the mobile jaw and the fixed jaw apart when at rest.

4. Apparatus for remote handling of equipment, comprising:

a fixed jaw and a mobile jaw;

actuating means for linearly displacing the mobile jaw relative to the fixed jaw; said actuating means comprising a first arm integral with a first handle, and a second arm integral with a second handle; said handles being articulated on a same articulation axis; each arm having a free end;

a cable having two ends and coupling said actuating means to said equipment; a first end of said cable being connected to the mobile jaw, said cable sliding inside a flexible sheath having a first end and an opposite second end; the first end of the sheath abutting the fixed jaw, and the free end of said first arm structured and arranged to serve as a stop for the second end of the sheath, while allowing the cable passing therethrough to slide freely; the free end of said second arm being connected to a second end of said cable;

a ratchet mechanism mounted on one of the handles cooperating with a stub provided on the other handle for holding said handles one against the other and therefore keeping the mobile jaw in a position close to the fixed jaw, except when the stub of the ratchet is released by the action of an unlocking mechanism;

wherein the two handles are brought towards one another, in a plane of movement perpendicular to the articulation axis, the arms move apart in the same plane, symmetrically one to the other in relation to a median axis passing through the articulation axis and between the handles to make an angle such that when the two handles are one against the other, the distance between the free ends of the two arms is at least equal to the maximum linear displacement of the mobile jaw.

5. The apparatus according to claim 4, wherein each arm and its respective handle is formed as a strip substantially leaving supports for the handles and the articulation flat, while the arms are twisted 90° on themselves to receive respectively at their free ends machining forming the stop for the sheath for the first arm, and the cable connection for the second arm.

6. The apparatus according to claim 4, further comprising a return spring arranged between the two handles close to their articulation, said spring urging said handles and hence the mobile jaw and the fixed jaw apart when at rest.

7. Apparatus for remote handling of equipment, comprising:

a fixed jaw and a mobile jaw;

actuating means for linearly displacing the mobile jaw relative to the fixed jaw; said actuating means comprising a first arm integral with a first handle, and a second arm integral with a second handle; said handles being articulated on a same articulation axis; each arm having a free end;

a cable having two ends and coupling said actuating means to said equipment; a first end of said cable being connected to the mobile jaw, said cable sliding inside a flexible sheath having a first end and an opposite second end; the first end of the sheath abutting the fixed jaw, and the free end of said first arm structured and arranged to serve as a stop for the second end of the sheath, while allowing the cable passing therethrough to slide freely; the free end of said second arm being connected to a second end of said cable;

a ratchet mechanism mounted on one of the handles cooperating with a stub provided on the other handle for holding said handles one against the other and therefore keeping the mobile jaw in a position close to the fixed jaw, except when the stub of the ratchet is released by the action of an unlocking mechanism;

wherein the two handles are brought towards one another in a plane of movement perpendicular to the articulation axis, the arms to which they are respectively connected are angled in the same plane, on the same side of a median axis passing through the articulation axis and between the handles, the second arm being angled more than the first arm, such that when the two handles are one against the other, the distance between the free ends of the two arms is at least equal to the maximum linear displacement of the mobile jaw.

8. The apparatus according to claim 7, wherein each arm and its respective handle is formed as a strip substantially leaving supports for the handles and the articulation flat, while the arms are twisted 90° on themselves to receive respectively at their free ends machining forming the stop for the sheath for the first arm, and the cable connection for the second arm.

9. The apparatus according to claim 7, further comprising a return spring arranged between the two handles close to their articulation, said spring urging said handles and hence the mobile jaw and the fixed jaw apart when at rest.

10. The apparatus according to claim 7, wherein the area of articulation of the second arm does not coincide with the area where said second arm joins the second handle, which is offset by an appendage that unites the two areas.

* * * * *